United States Patent
Mittal et al.

(10) Patent No.: US 10,346,384 B2
(45) Date of Patent: Jul. 9, 2019

(54) EFFICIENT DATABASE MULTI-VERSION CONCURRENCY CONTROL

(71) Applicant: SAP SE, Walldorf (DE)

(72) Inventors: Rahul Mittal, Pune (IN); Jay Sudrik, Pune (IN); Amit Pathak, Pune (IN)

(73) Assignee: SAP SE, Walldorf (DE)

( * ) Notice: Subject to any disclaimer, the term of this patent is extended or adjusted under 35 U.S.C. 154(b) by 403 days.

(21) Appl. No.: 15/359,050

(22) Filed: Nov. 22, 2016

(65) Prior Publication Data

US 2018/0144014 A1 May 24, 2018

(51) Int. Cl.
*G06F 16/30* (2019.01)
*G06F 16/23* (2019.01)

(52) U.S. Cl.
CPC .................... *G06F 16/2322* (2019.01)

(58) Field of Classification Search
CPC .................................................. G06F 16/2322
See application file for complete search history.

(56) References Cited

U.S. PATENT DOCUMENTS

| | | | | |
|---|---|---|---|---|
| 5,842,196 A * | 11/1998 | Agarwal | | G06F 16/2246 |
| 5,893,117 A * | 4/1999 | Wang | | G06F 8/71 |
| 6,615,219 B1 * | 9/2003 | Bruso | | G06F 16/10 |
| | | | | 707/699 |
| 8,352,450 B1 * | 1/2013 | Mraz | | G06F 16/273 |
| | | | | 707/705 |
| 9,477,557 B2 * | 10/2016 | Larson | | G06F 11/1471 |
| 2003/0069902 A1 * | 4/2003 | Narang | | G06F 16/2477 |
| 2014/0372702 A1 * | 12/2014 | Subramanyam | | G06F 12/0848 |
| | | | | 711/129 |
| 2016/0147449 A1 * | 5/2016 | Andrei | | G06F 16/2308 |
| | | | | 707/814 |
| 2016/0147814 A1 * | 5/2016 | Goel | | G06F 16/2358 |
| | | | | 707/600 |
| 2016/0147906 A1 * | 5/2016 | Schreter | | G06F 16/9038 |
| | | | | 707/781 |
| 2016/0314161 A1 * | 10/2016 | Wen | | G06F 11/1469 |
| 2017/0177697 A1 * | 6/2017 | Lee | | H04L 67/10 |

\* cited by examiner

*Primary Examiner* — Mahesh H Dwivedi
(74) *Attorney, Agent, or Firm* — Schwegman Lundberg & Woessner, P.A.

(57) ABSTRACT

Example embodiments of a database employing an efficient form of multi-version concurrency control (MVCC) are described. In an example embodiment, in response to receiving an update command for a first row of a plurality of rows of a database, an image of the first row stored in a first memory area is stored in a second memory area. In a third memory area storing a first database structure and associated pointer corresponding to the image of the first row stored in the first memory area, a second data structure and associated pointer corresponding to the image of the first row in the second memory area are stored. The second data structure is linked to the first data structure. The image of the first row in the first memory area is overwritten with an image of a new version of the first row provided in the update command.

20 Claims, 16 Drawing Sheets

EFFICIENT DATABASE MULTI-VERSION CONCURRENCY CONTROL

FIELD

The present application relates generally to data processing and, more specifically in an example embodiment, to a database providing multi-version concurrency control (MVCC).

BACKGROUND

Databases are often configured to be accessed by multiple users via insert, select, update, and delete (ISUD) operations. One or more such operations may be logically interrelated, thus operating as a single database "transaction." To prevent a transaction from accessing inconsistent data, such as data in a database row that is currently being updated as part of another transaction, some significant form of isolation between the database operations of one transaction versus another is typically employed. In one example, a database may employ the American National Standards Institute (ANSI) "serializable" isolation level, during which only a single (current) version of each database row may be maintained, with each transaction employing a "lock" or other exclusive access right when accessing a row to prevent reading or writing of that row during other transactions. Consequently, significant use of such locks may result in reduced performance due to one or more transactions being blocked from continued execution for extended periods of time.

To address this reduced performance, some databases employ multi-version concurrency control (MVCC), under which multiple versions of at least some rows are associated with corresponding timestamps to facilitate reading or scanning of older, consistent versions of rows while the current version of a row is being updated. By storing and tracking multiple versions of rows, blocking of transactions is typically reduced, resulting in increased database throughput.

BRIEF DESCRIPTION OF DRAWINGS

The present disclosure is illustrated by way of example and not limitation in the figures of the accompanying drawings, in which like reference numbers indicate similar elements.

DETAILED DESCRIPTION

In the following description, for purposes of explanation, numerous specific details are set forth to provide an understanding of various example embodiments of the present subject matter. It will be evident, however, to those skilled in the art, that example embodiments of the present subject matter may be practiced without these specific details.

Figure 1:
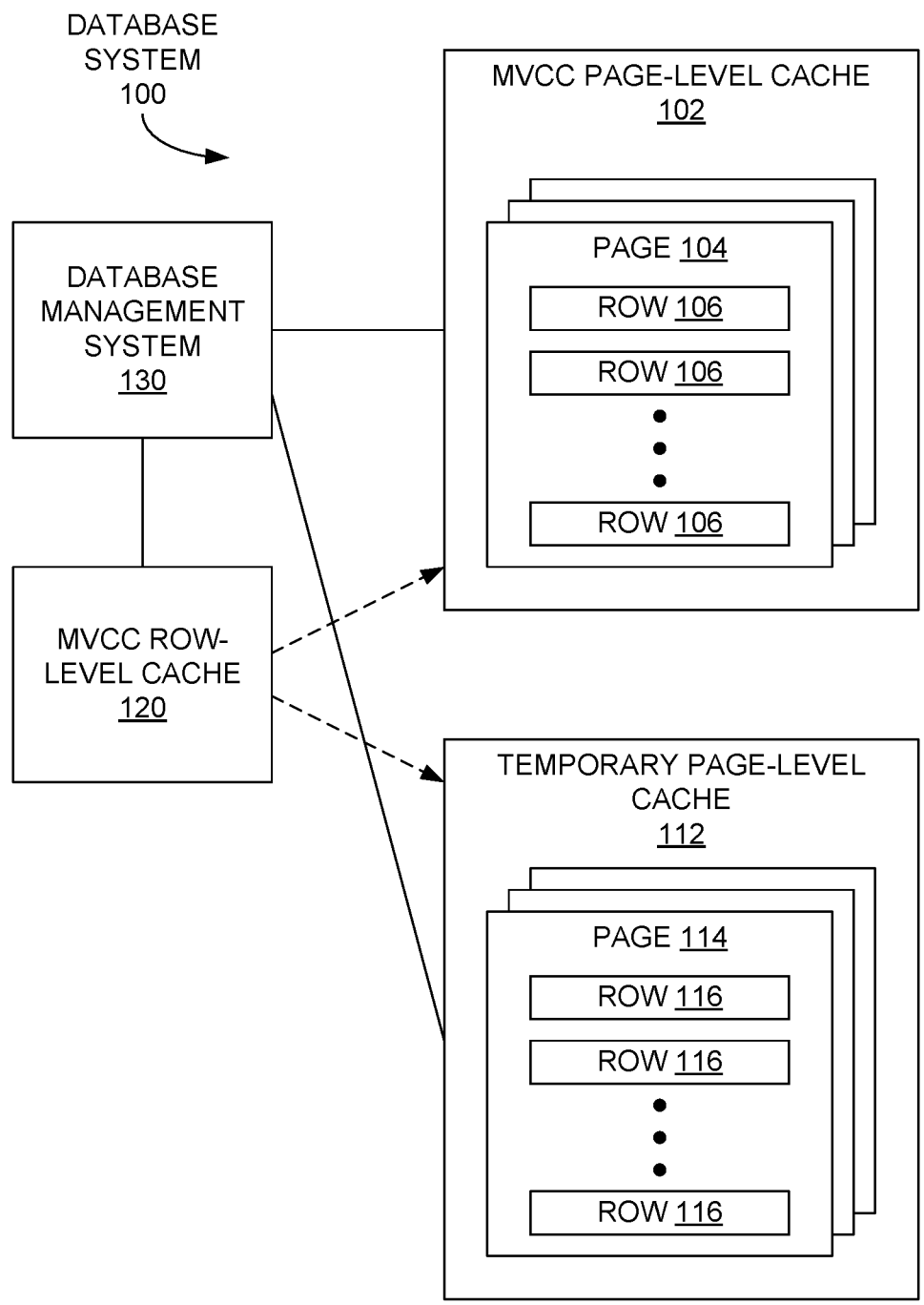
FIG. 1 is a block diagram of an example database system.

FIG. 1 is a block diagram of an example database system 100 that may serve as a relational database in an example embodiment, although other types of databases may be employed in the database system 100 in other embodiments. The database system 100 may include first, second, and third memories or memory areas. In the particular example embodiment of FIG. 1, the first, second, and third memories may be a multi-version concurrency control (MVCC) page-level cache 102, a temporary page-level cache 112, and an MVCC row-level cache 120, respectively, although each of the three memories or memory areas may be configured differently in other examples. Also in an example embodiment, a page-level cache may be a memory organized as multiple memory pages, each page of which may be allocated, deallocated, swapped out for another page from another memory area, and so on, with each page capable of storing multiple rows of a database. More specifically in the example embodiment of FIG. 1, the MVCC page-level cache 102 may include multiple pages 104, each of which may store one or more rows 106, with each of the rows 106 containing an image of a current version of a corresponding row of the database. The temporary page-level cache 112, in an example embodiment, may include multiple pages 114, each of which may store one or more rows 116, with each of the rows 116 containing an image of a previous version of a corresponding row in the database.

A row-level cache, in an example embodiment, may be a memory organized as multiple rows of memory, each row of which may be allocated, deallocated, swapped out for another row from another memory area, and so on. In the example embodiment of FIG. 1, the MVCC row-level cache 120 may include information referencing various rows 106, 116 of the MVCC page-level cache 102 and the temporary page-level cache 112. In some example embodiments, the MVCC row-level cache 120 may store one or more images of previous versions of rows of the database in addition to those stored in the temporary page-level cache 112.

The database system 100 may also include a database management system 130 configured to receive and execute database commands (e.g., from a client device not explicitly depicted in FIG. 1) employing the caches 102, 112, and 120. The database management system 130 may also perform management, housekeeping, and other activities (e.g., garbage collection) of the database in some example embodiments.

In an example embodiment, one or more of the database management system 130, the row-level cache 120, the MVCC page-level cache 102, or the temporary page-level cache 112 may be implemented on one or more server systems or other computing systems. Further, the database management system 130 may communicate with one or more of the row-level cache 120, the MVCC page-level cache 102, or the temporary page-level cache 112, as well as one or more client devices and other devices or systems, via a communication network, such as a wide area network (WAN) (e.g., the Internet), a wireless WAN (WWAN), a local area network (LAN), a wireless LAN (WLAN), a cellular data network (e.g., a third-generation (3G) or fourth-generation (4G) network), another communication connection, and/or combinations thereof.

Figure 2:
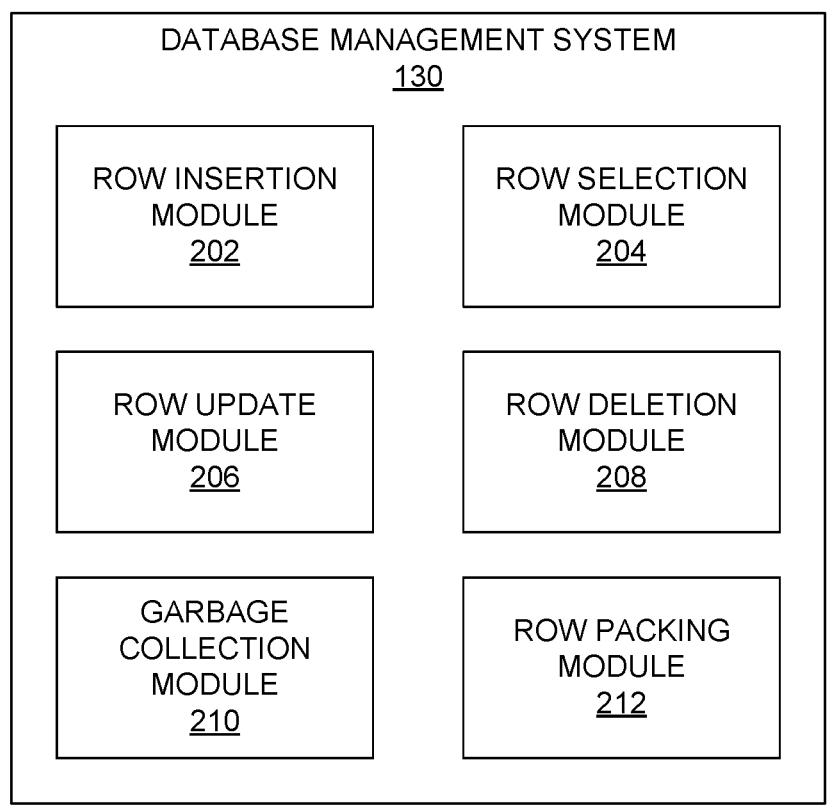
FIG. 2 is a block diagram of an example database management system of the example database system of FIG. 1.

FIG. 2 is a block diagram of an example database management system 130 of the database system 100 of FIG. 1. The database management system 130, in an example embodiment, may include a module for each of multiple database operations (e.g., a row insertion module 202, a row selection module 204, a row update module 206, and a row deletion module 208 for the insert, select, update, and delete (ISUD) operations, respectively), a garbage collection module 210, and a row packing module 212. In other embodiments, the database management system 130 may contain a greater or lesser number of modules than those depicted in FIG. 2. Each module 202-212 may be implemented in hardware, software (e.g., instructions stored in memory that are executed by one or more hardware processors), or some combination thereof. The operation of each of the modules 202-212 is described below in conjunction with FIGS. 3A-3C and FIGS. 4-13.

Figure 3A:
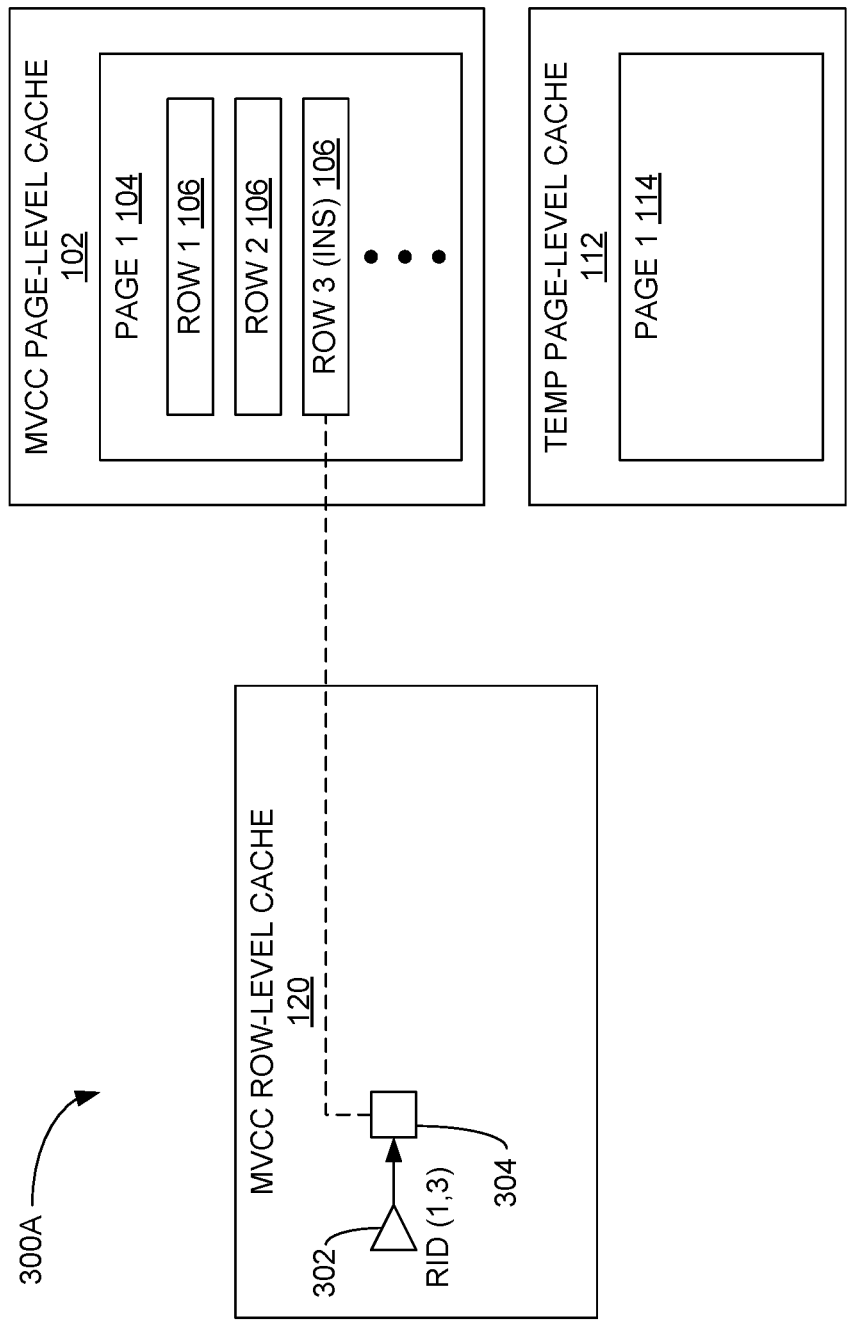
FIG. 3A is a block diagram of an example MVCC page-level cache, example temporary page-level cache, and example row-level cache of the example database system of FIG. 1 after the insertion of a row into the database.
Figure 3B:
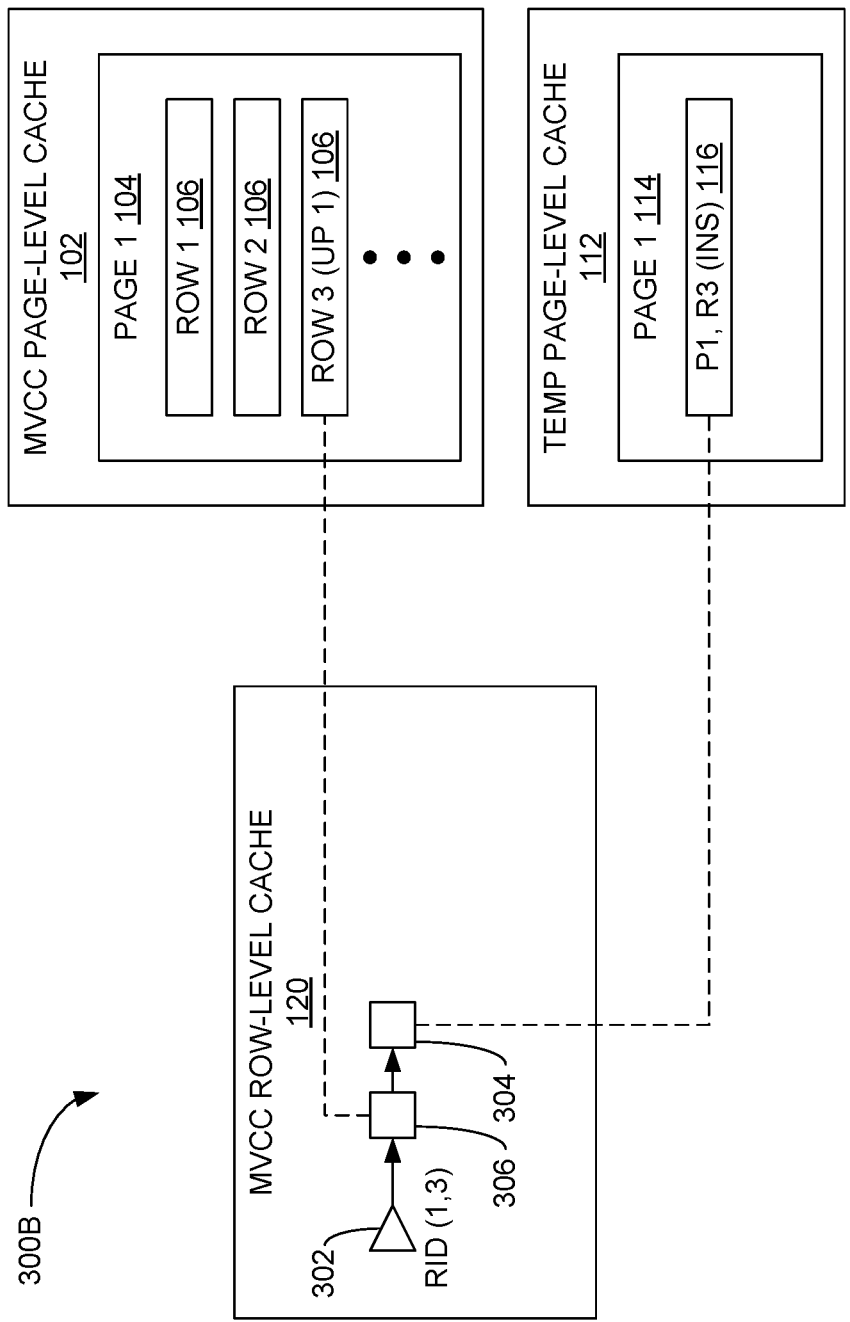
FIG. 3B is a block diagram of the example MVCC page-level cache, example temporary page-level cache, and example row-level cache of the example database system of FIG. 1, in which the inserted database row has been updated.
Figure 3C:
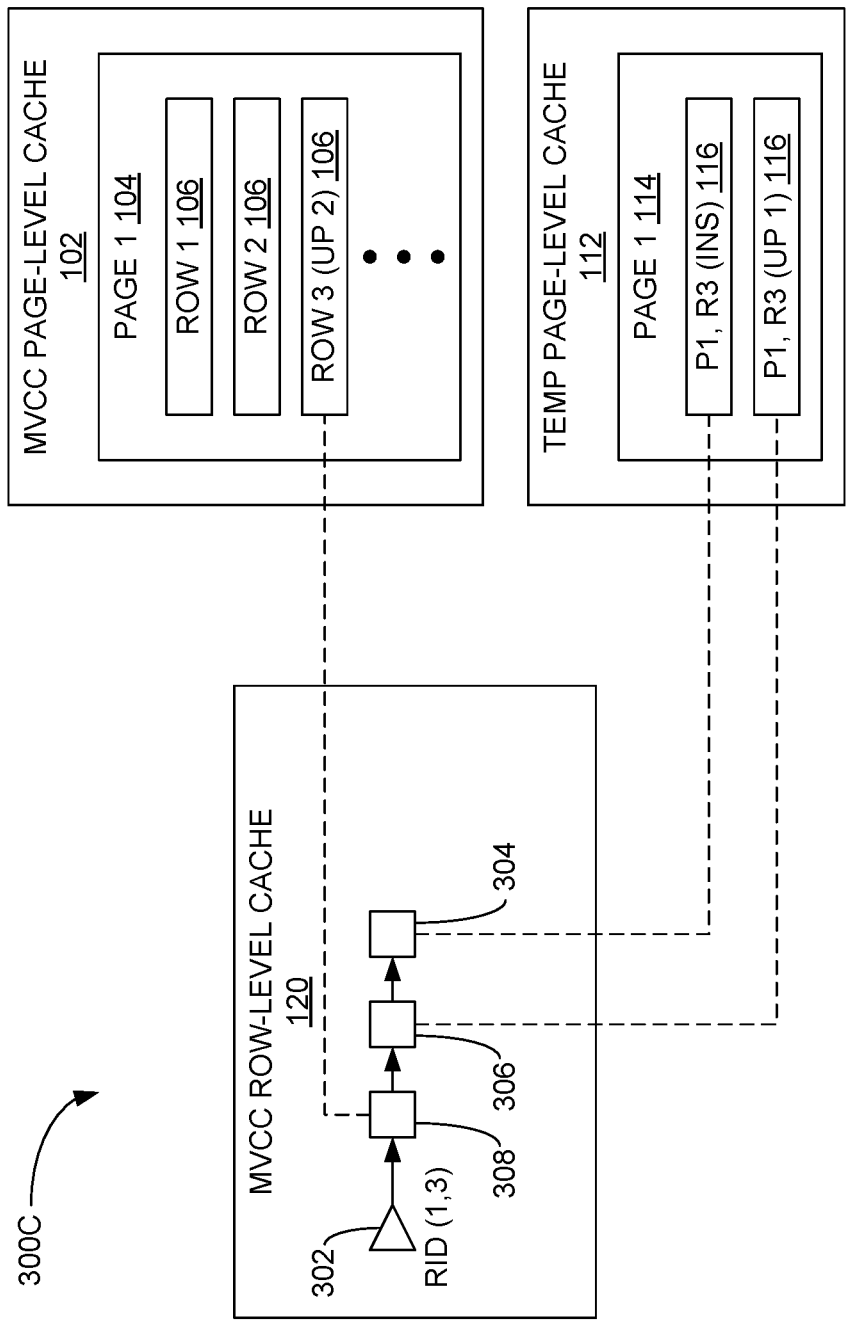
FIG. 3C is a block diagram of the example MVCC page-level cache, example temporary page-level cache, and example row-level cache of the example database system of FIG. 1, in which the updated database row has again been updated.

FIGS. 3A, 3B, and 3C depict various states 300A, 300B, and 300C, respectively, of the MVCC row-level cache 120, the MVCC page-level cache 102, and the temporary page-level cache 112 of the database system 100 of FIG. 1. FIG. 3A, for example, is a block diagram of the caches 102, 112, 120 after the insertion of a row 106 into the database. In this example embodiment, the row 106 (e.g., Row 3 (INS)) has been inserted into Page 1 104 of the MVCC page-level cache 102, which contains current images of each of the database rows 106. In an example embodiment, in response to the insertion of the row 106, the MVCC page-level cache 102 may return a unique row identifier for the row. At this point, the temporary page-level cache 112 does not contain any images of previous versions of the rows of the database.

In conjunction with the insertion of the row 106, the database management system 130 (e.g., via the row insertion module 202) may update the MVCC row-level cache 120 with a data structure 304, termed a "stub row version" 304 herein, referencing the inserted row 106 in the MVCC page-level cache 102. In an example embodiment, the stub row version 304 may include a pointer to the inserted row 106 in the MVCC page-level cache 102. In addition, the database management system 130 may add a row header 302 linked (e.g., via a pointer) to the stub row version 304. In an example embodiment, the row header 302 may mark the start of information in the row-level cache 120 for this particular row (e.g., Page 1, Row 3) of the database. As is described below in conjunction with FIG. 4, a row-mapping table 410 may relate each row identifier (e.g., RID (1, 3)) with a row address within the row-level cache 120 at which the row header 302 for the corresponding database row is located. An example method including the operations for performing a row insertion operation is described below in connection with FIG. 5.

In the example embodiment of FIG. 3A, only rows 106 that have been inserted into the MVCC page-level cache 102 after some point in time are represented by a row header 302 and associated stub row version 304 in the row-level cache 120. In other embodiments, each row 106 of the MVCC page-level cache 102 may be represented by a row header 302 and associated stub row version 304 in the row-level cache 120. In either case, each row 106 in the MVCC page-level cache 102 that has been updated may be represented by a row header 302 and one or more stub row versions 304 in the row-level cache 120.

For example, FIG. 3B is a block diagram of the example caches 102, 112, 120 of FIG. 1 in which the inserted database row 106 (Page 1, Row 3) has been updated. In performing the update operation, the database management system 130 (e.g., via the row update module 206) may write the current image of the row 106 to be updated in the temporary page-level cache 112. In this example, the current image is written to a page 114 (e.g., Page 1) of the temporary page-level cache 112. Further, the pointer in the stub row version 304 shown in FIG. 1 that originally pointed to the inserted row 106 at Page 1, Row 3, in the MVCC page-level cache 102 is modified to point to that same version of the row that is now stored in the temporary page-level cache 112 as row 116. In addition, to represent the updated version of the row 106, a new stub row version 306, including a pointer to the current image of the row in the MVCC page-level cache 102, is stored to the row-level cache 120. Also, the row header 302 may be linked to the new stub row version 306, and the new stub row version 306, in turn, may be linked to the older stub row version 304. The row 106 (Page 1, Row 3) in the MVCC page-level cache 102 may then be updated with the new image (Row 3 (Up 1)) provided in the update command.

In examples in which the earlier stub row version 304 initially pointing to the current version of the row 106 in the MVCC page-level cache 102 is not stored the row-level cache 120, the database management system 130 may generate that stub row version 304 in conjunction with the new stub row version 306.

FIG. 3C is a block diagram of the example caches 102, 112, 120, in which the previously updated database row 106 (Page 1, Row 3) has again been updated. In an example embodiment, the current value of the previously updated row 106 is stored to another row 116 (denoted as P1, R3 (UP 1) in FIG. 3C) in page 1 114 of the temporary page-level cache 112, and the associated stub row version 306 is updated so that its pointer refers to that location in the temporary page-level cache 112. In addition, a new stub row version 308 corresponding to the associated row 106 in the MVCC page-level cache 102 may be stored in the row-level cache 120 with a pointer to that row 106. Further, the row header 302 may be linked to the new stub row version 308, and the stub row version 308 may be linked to the previous stub row version 306. Consequently, in some example embodiments, the row header 302 and corresponding stub row versions 308, 306, 304 may form a singly-linked list facilitating retrieval of the image of the current version of the row 106, and possibly one or more images of previous versions of the same row 116. The image of the newest version of the row 106 (designated as Row 3 (Up 2) in FIG. 3C) may then be stored at the same row 106 (Page 1, Row 3) in the MVCC page-level cache 102.

Figure 4:
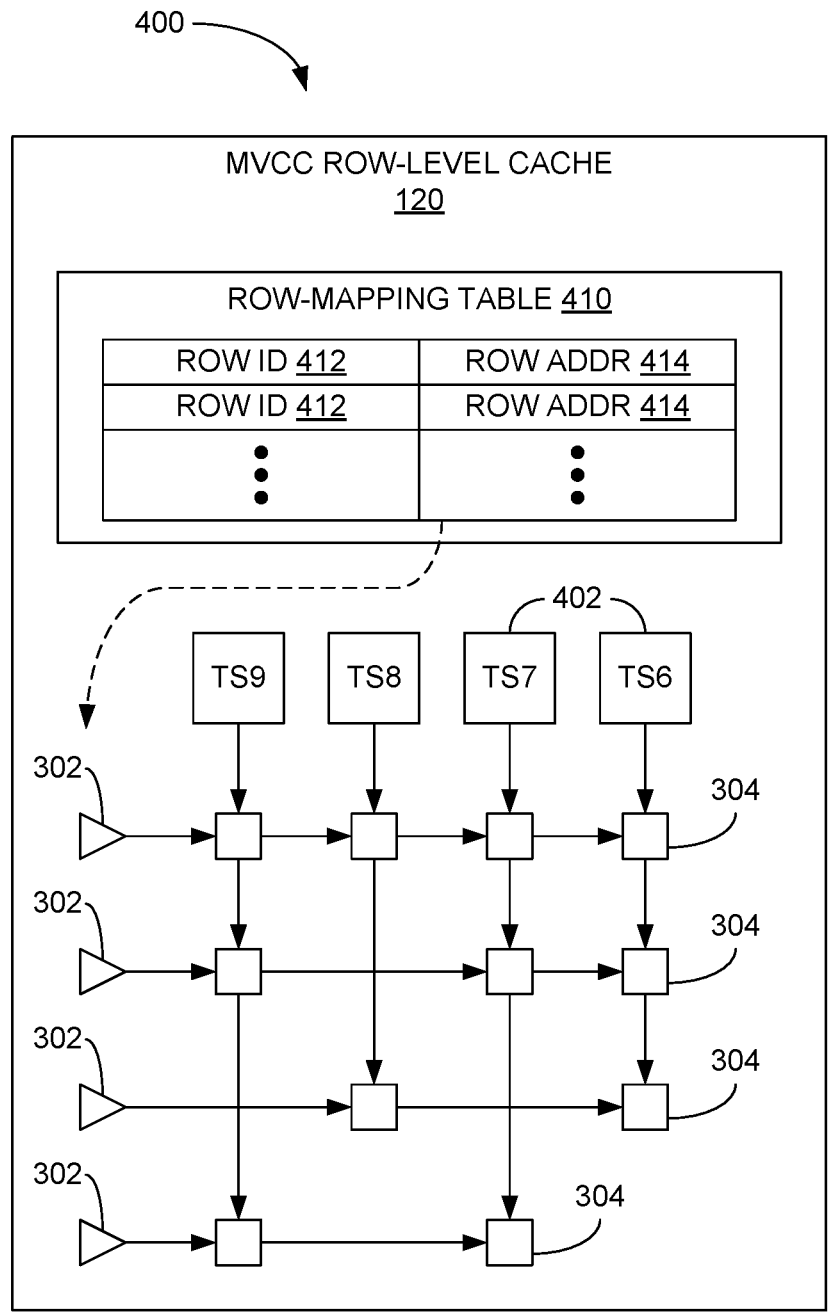
FIG. 4 is a block diagram of an example state of the example row-level cache of FIG. 1.

FIG. 4 is a block diagram of an example state 400 of the example row-level cache 120 of FIG. 1, in which several rows have been updated, as evidenced by the various rows of the row-level cache 120, with each row including a row header 302 with multiple stub row versions 304 linked therewith. In addition, a row-mapping table 410, as mentioned above, may be included in the row-level cache 120 or another memory area that may relate a row identifier 412 associated with each row header 302 with the corresponding row address 414 of that row header 302 within the row-level cache 120. Accordingly, the information associated with each row of the database represented in the row-level cache 120 may be located and accessed via its row identifier 412 via the row-mapping table 410.

Also shown in FIG. 4 are a plurality of transaction data structures 402, each of which may include a commit timestamp (denoted TS6, TS7, and so on) of a corresponding database transaction that may indicate the time at which the transaction was committed. In an example embodiment, each transaction data structure 402 may be linked to those stub row versions 304 involved in that transaction as a linked list. For example, the transaction corresponding with TS9 involved updates to the first, second, and fourth rows of the row-level cache 120. In some example embodiments, each of the stub row versions 304 in the row-level cache 120 may be linked directly back to its corresponding transaction data structure 402.

Also in an example embodiment, the stub row versions 304 associated with timestamps prior to TS6 (e.g. TS5, TS4, and so on) are depicted as no longer being included in the row-level cache 120, as they are deemed to no longer be relevant for subsequent scanning operations. In addition, the rows 116 of the temporary page-level cache 112 corresponding to those timestamps may have also been deleted from the temporary page-level cache 112 in that example embodiment.

As described more fully below, the row-level cache 120, as described above in conjunction with FIGS. 3A, 3B, 3C, and 4, in connection with the MVCC page-level cache 102 and the temporary page-level cache 112, may enable a database employing MVCC to facilitate efficient selection or scanning of database rows at different desired isolation levels. For example, to implement reads or scans at a snapshot isolation level, no access locks are to be imposed during a scan, so that the scan will not be blocked for any concurrent row updates. Moreover, the result of such a scan will be a consistent view of the database data at the timestamp associated with the scan, and thus will not be affected by concurrent updates of the database while the scan is in progress. In an example embodiment, to support such snapshot isolation, the database management system 130 employs the caches 102, 112, 120 to store previous versions of rows that are being updated, and to store a commit timestamp for each row version so that a snapshot isolation scanner may qualify an appropriate version of a row image to be returned based on the stored commit timestamps, as described above. Also, by storing the current row images and the previous row images in separate caches 102, 112, supplementing of databases that are not configured to facilitate snapshot isolation is possible, and execution of ANSI serializable isolation may still be provided by directly accessing the MVCC page-level cache 102 without accessing either the temporary page-level cache 112 or the row-level cache 120.

Figure 5:
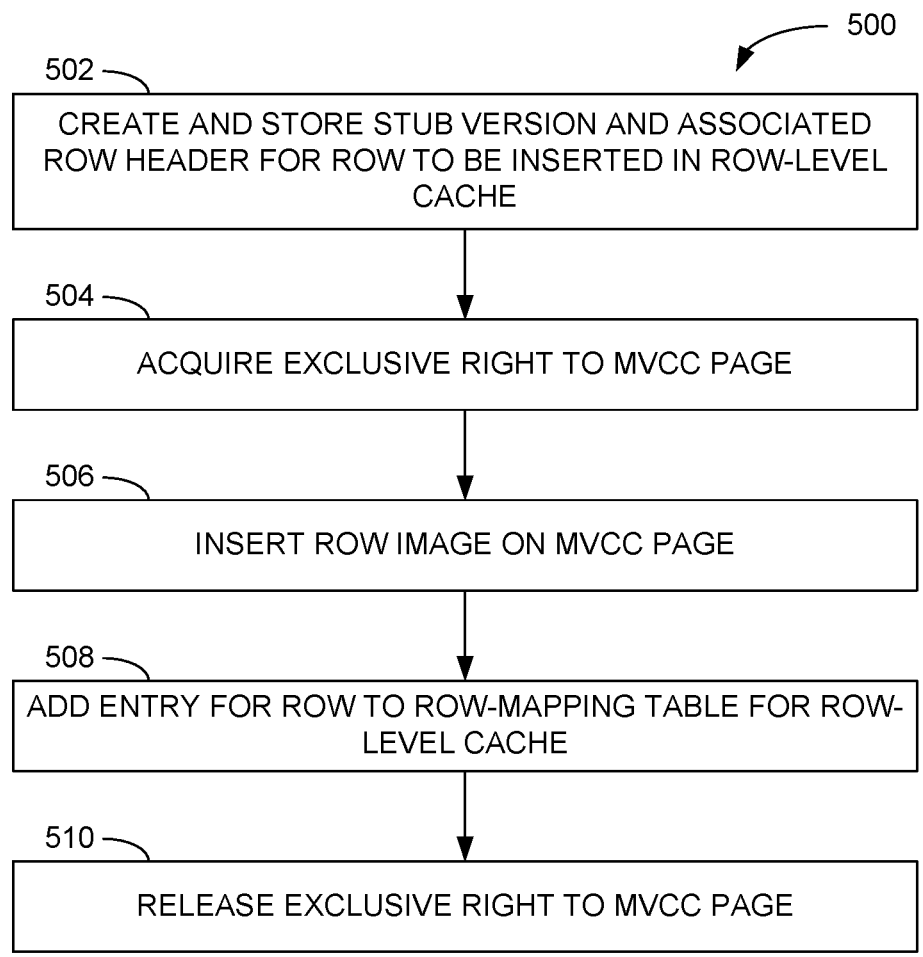
FIG. 5 is a flow diagram of an example method of performing an insert operation in the example database system of FIG. 1.

FIGS. 5-8 each provide a flow diagram describing the operation of the database management system 130 in response to receiving an insert, select, update, or delete row operation, respectively, employing the row-level cache 120 discussed above. For example, FIG. 5 is a flow diagram of an example method 500 of performing an insert operation in the example database system 100 of FIG. 1. In response to receiving an insert command, the database management system 130 (e.g., via the row insertion module 202), may create and store in the row-level cache 120 a stub row version 304 and associated row header 302 for the row to be inserted into the database (operation 502). The row insertion module 202 may acquire an exclusive right (e.g., an exclusive latch, lock, or the like) to the page 104 of the MVCC page-level cache 102 (operation 504) to prevent accesses to the page 104 by other transactions. The row insertion module 202 may then insert the row image provided in the received insert command onto the page 104 (operation 506). In response to the insertion, the row insertion module 202 may receive a unique row identifier 412 for the inserted row. The row insertion module 202 may then add an entry to the row-mapping table 410 associating the row identifier 412 with the row address 414 for the row header 302 and the stub row version 304 stored in the row-level cache 120 (operation 508) to render the stub row version 304 available for select (e.g., read) and update operations. The row insertion module 202 may then release the exclusive right to the page 104 (operation 510).

While the method 500 and other methods described herein are illustrated as performing the depicted operations in a particular order, other orders of execution, including overlapping, simultaneous, or concurrent execution, may be employed in other embodiments.

Figure 6:
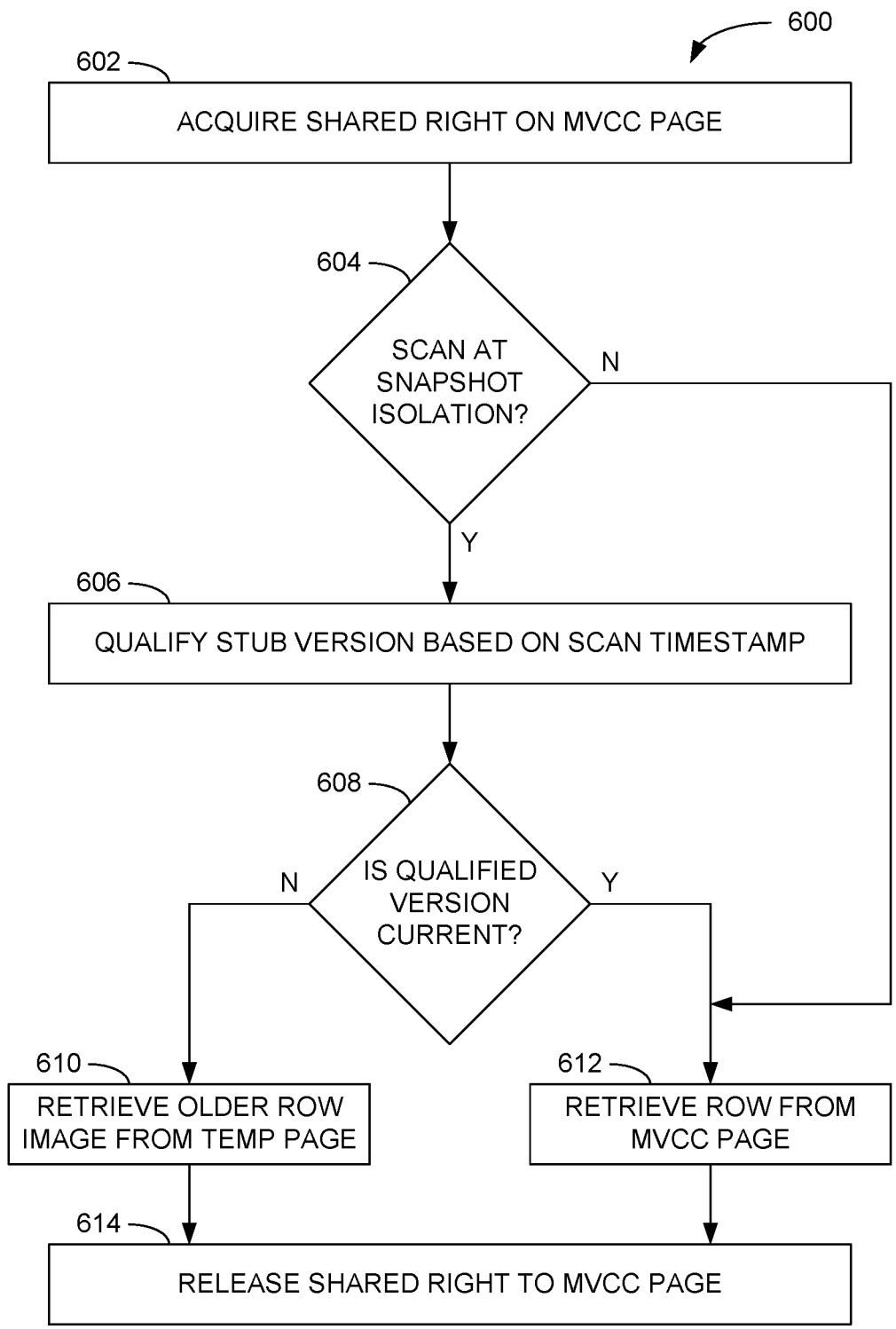
FIG. 6 is a flow diagram of an example method of performing a select operation in the example database system of FIG. 1.

FIG. 6 is a flow diagram of an example method 600 of performing a select (e.g., read or scan) operation in the example database system 100 of FIG. 1. In the method 600, in response to receiving a select command, the database management system 130 (e.g., via the row selection module 204) may acquire a shared right (e.g., a shared lock, latch, or the like) to the page 104 of the MVCC page-level cache 102 on which the desired row is stored (operation 602) so that other transactions may read, but not write, that page 104. If the scan or selection is not to be made at a snapshot isolation level (e.g., only the image of the current version of the database row is to be retrieved, such as in the ANSI serializable isolation level) (operation 604), the row selection module 204 may retrieve the image of the current version of the row directly from the shared page 104 (operation 612) and release the shared right to the page 104 (operation 614).

If, instead, the scan or selection is to be made at a snapshot isolation level (operation 604), the row selection module 204 may qualify the particular stub row version 304 in the row-level cache 120 based on a timestamp corresponding to the scan or selection (operation 606). If the stub row version 304 for the current version of the row is qualified (operation 608), the row selection module 204 may retrieve the image of the current version of the row from the shared page 104 of the MVCC page-level cache 102 (operation 612) and release the shared right to the page 104 (operation 614). In an example embodiment, a particular stub row version 304 is qualified by beginning at the first stub row version 304 linked to the corresponding row header 302 and progressing along the linked list until the qualified stub row version 304 is encountered. In an example embodiment, the particular version of the row to be qualified is represented by the stub row version 304 corresponding to the latest commit timestamp that is less than or equal to the scan timestamp.

If, on the other hand, the stub row version 304 for a previous version of the row is qualified (operation 608), the row selection module 204 may retrieve the image of the qualified previous version of the row from the page 114 of the temporary page-level cache 112 (operation 610). After the retrieval of the row image of interest, the row selection module 204 may then release the shared right to the page 104 of the MVCC page-level cache 102 (operation 614).

Figure 7:
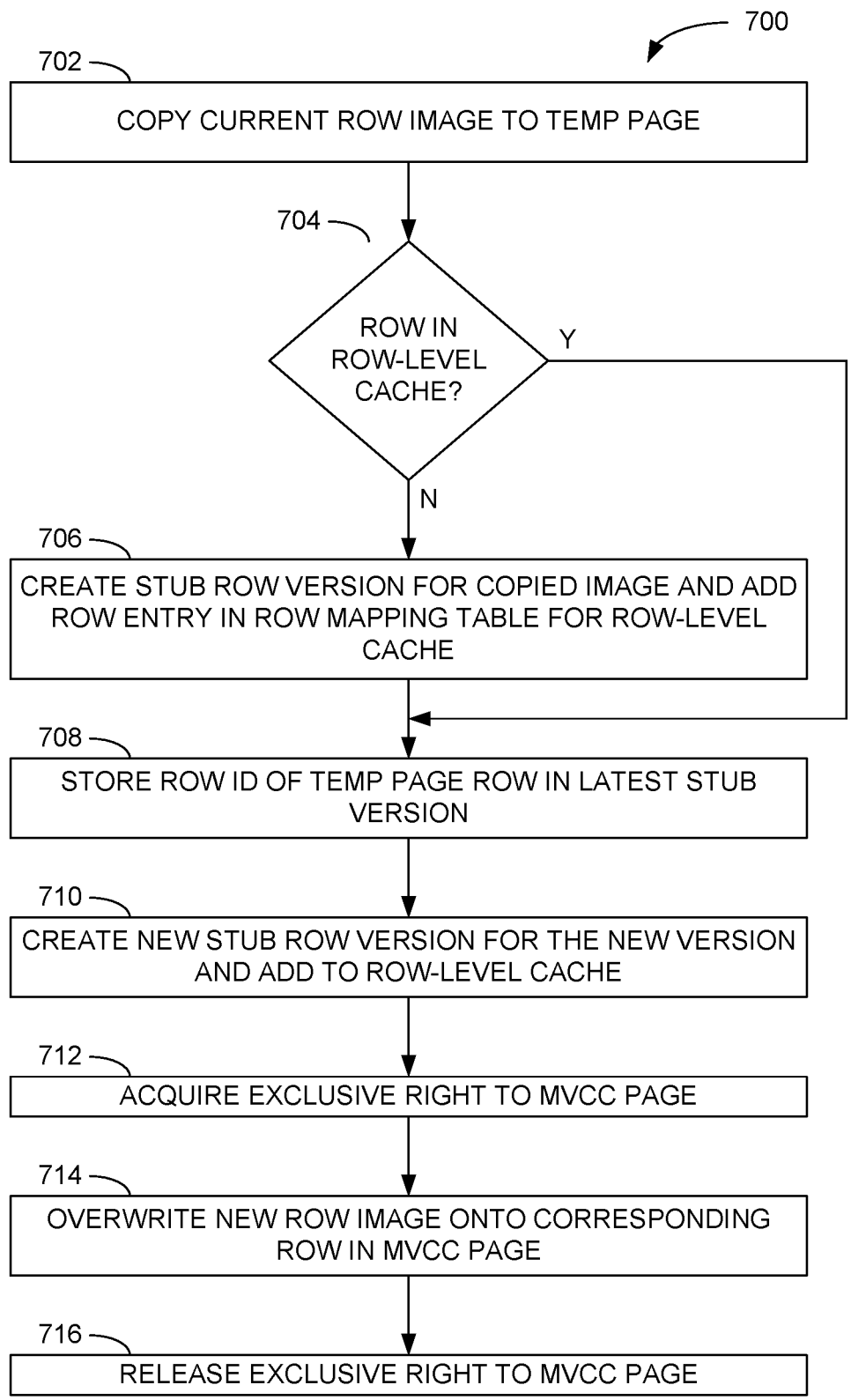
FIG. 7 is a flow diagram of an example method of performing an update operation in the example database system of FIG. 1.

FIG. 7 is a flow diagram of an example method 700 of performing an update operation in the example database system 100 of FIG. 1. In the method 700, the database management system 130 (e.g., via the row update module 206), in response to receiving an update command, may store a copy of the current image of the row indicated in the update command from the MVCC page-level cache 102 to a page 114 of the temporary page-level cache 112 (operation 702). In an example embodiment described in greater detail below in conjunction with FIG. 9, the page 114 to which the current image is stored is a page reserved for those previous versions of rows that were obsoleted (e.g., via an update command) by a corresponding transaction. In response to the storing of the image of the current row version, the row update module 206 may receive a unique row identifier 412 for the copied image stored in the temporary page-level cache 112.

If a row, with one or more stub row versions 304, is not already represented in the row-level cache 120 (operation 704), the row update module 206 may create a new stub row version 304 for the copied image, along with a corresponding row header 302, and add an entry in the row-mapping table 410 including a row identifier 412 and the row address 414 in the row-level cache 120 at which the row header 302 and new stub row version 304 are stored (operation 706). If, instead, the database row is already represented in the row-level cache 120 (operation 704), a new stub row version 304 for the copied version need not be created.

The row update module 206 may also store the row identifier 412 received from the copying of the current image of the row to the temporary page-level cache 112 in the stub row version 304 that previously existed or was newly created for that version (operation 708), as indicated above. The row update module 206 may also create a new stub row version 304 for the new version of the row that was received in the update command (operation 710) and add the new stub row version 304 to the row-level cache 120 in the singly-linked list headed by the row header 302 associated with the database row being updated (operation 710), as described earlier in connection with FIGS. 3B and 3C. A link between the new stub row version 304 and the appropriate transaction data structure 402 may also be made. The row update module 206 may then complete the processing of the update command by acquiring an exclusive right (e.g., lock or latch) to the page 104 of the MVCC page-level cache 102 in which the row to be updated is located (operation 712), overwriting the new image for that row onto the corresponding row 106 in that page 104 (operation 714), and releasing the exclusive right to the page 104 (operation 716).

Figure 8:
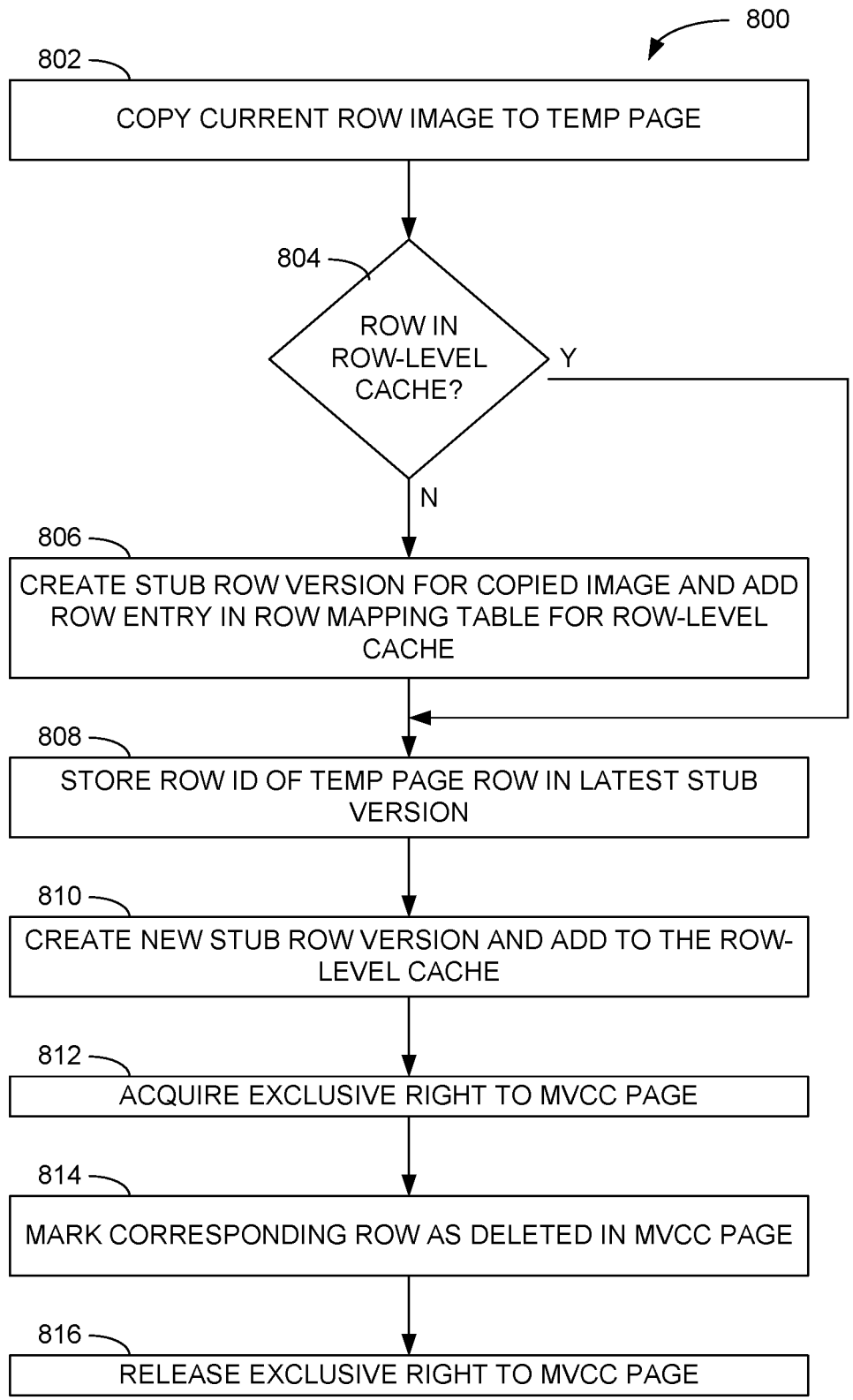
FIG. 8 is a flow diagram of an example method of performing a delete operation in the example database system of FIG. 1.

FIG. 8 is a flow diagram of an example method 800 of performing a delete operation in the database system 100 of FIG. 1. In the method 800, operations 802 through 808, including the copying of the current row image from the appropriate page 104 of the MVCC page-level cache 102 to a page 114 of the temporary page-level cache 112, to the storing of the row identifier 412 received as a result of the copying of the current row image to the corresponding current stub row version 304 in the row-level cache 120, are substantially the same as operations 702 through 708 of FIG. 7, presented above. Thereafter, the database management system 130 (e.g., the row deletion module 208) may create a new stub row version 304 representing the deletion of the database row and add the new stub row version 304 to the row-level cache 120 in the singly-linked list headed by the row header 302 associated with the database row being deleted (operation 810). The row deletion module 208 may then complete the processing of the delete command by acquiring an exclusive right (e.g., lock or latch) to the page 104 of the MVCC page-level cache 102 in which the row to be deleted is located (operation 812), marking the corresponding row 106 in that page 104 as deleted (operation 814), and releasing the exclusive right to the page 104 (operation 816).

Figure 9:
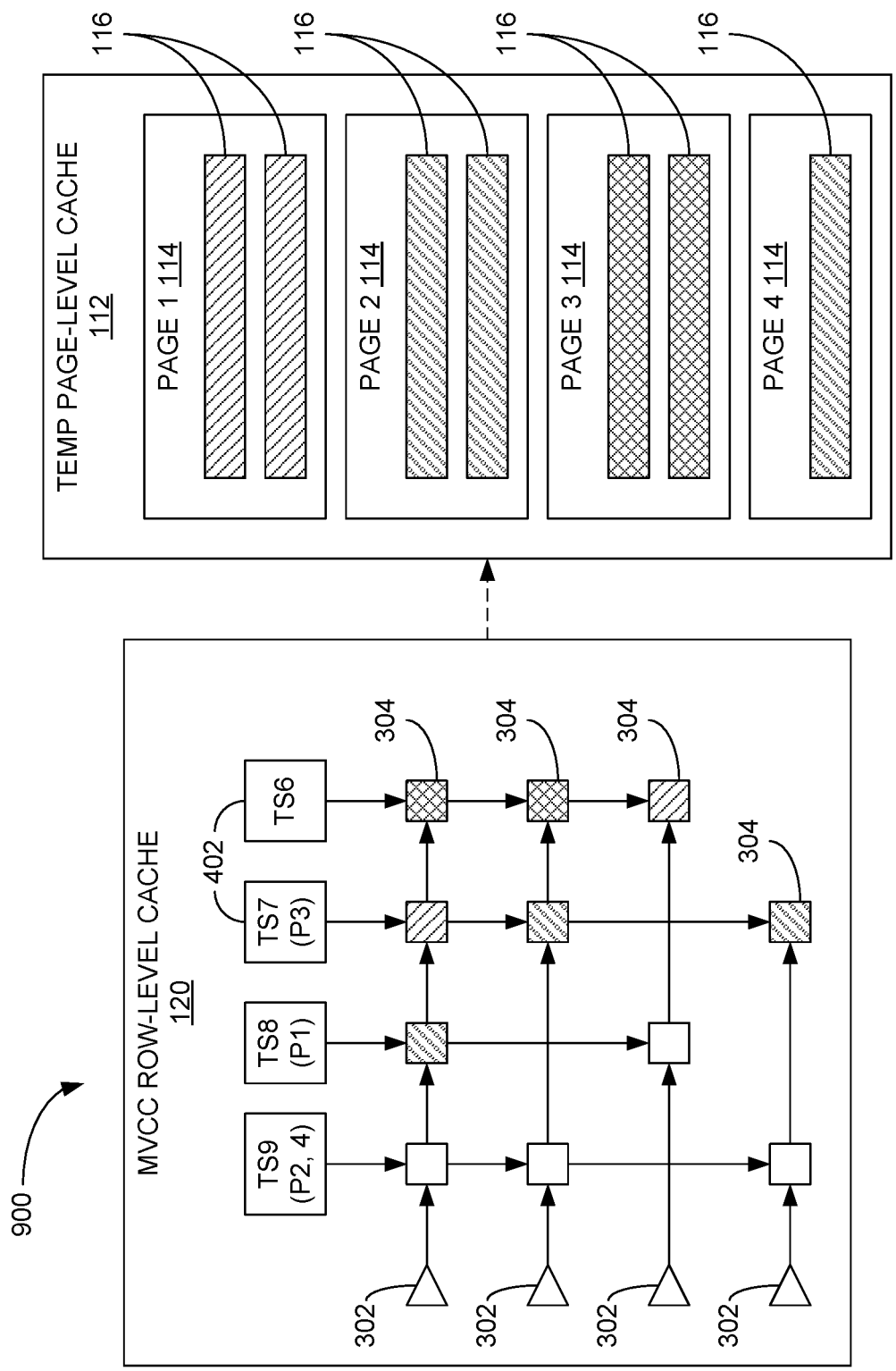
FIG. 9 is a block diagram of another example state of an example row-level cache and an example temporary page-level cache in which previous versions of rows are stored among pages in the temporary page-level cache according to the transaction that obsoleted each row.

FIG. 9 is a block diagram of another example state 900 of the row-level cache 120 and the temporary page-level cache 112 in which previous versions of rows are stored among pages 114 in the temporary page-level cache 112 according to the transaction that obsoleted each row. In this particular example, the stub row versions 304 and associated previous versions of database rows (stored in rows 116 in the temporary page-level cache 112) that were obsoleted by the transaction at timestamp 7 (TS7) are marked by a cross-hatched pattern. Further, the stub row versions 304 and associated previous versions of database rows that were obsoleted by the transaction at timestamp 8 (TS8) are marked by a left-leaning striped pattern, and the stub row versions 304 and associated previous versions of database rows that were obsoleted by the transaction at timestamp 9 (TS9) are marked by a right-leaning striped pattern. As further illustrated in FIG. 9, those previous row versions that were obsoleted by a particular transaction are stored in one or more pages 114 of the temporary page-level cache 112 reserved for that transaction. In this example, Page 3 is reserved for transaction TS7, Page 1 is reserved for transaction TS8, and Pages 2 and 4 are reserved for transaction TS9. By organizing the older versions of database rows in the temporary page-level cache 112 among the pages 114 in such a fashion, write operations to the temporary page-level cache 112 may not involve the use of any lock, latch, or other exclusive or shared right to perform those operations. Moreover, bulk garbage collection (e.g., as performed by the garbage collection module 210 of FIG. 2) may be rendered more efficient.

Figure 10:
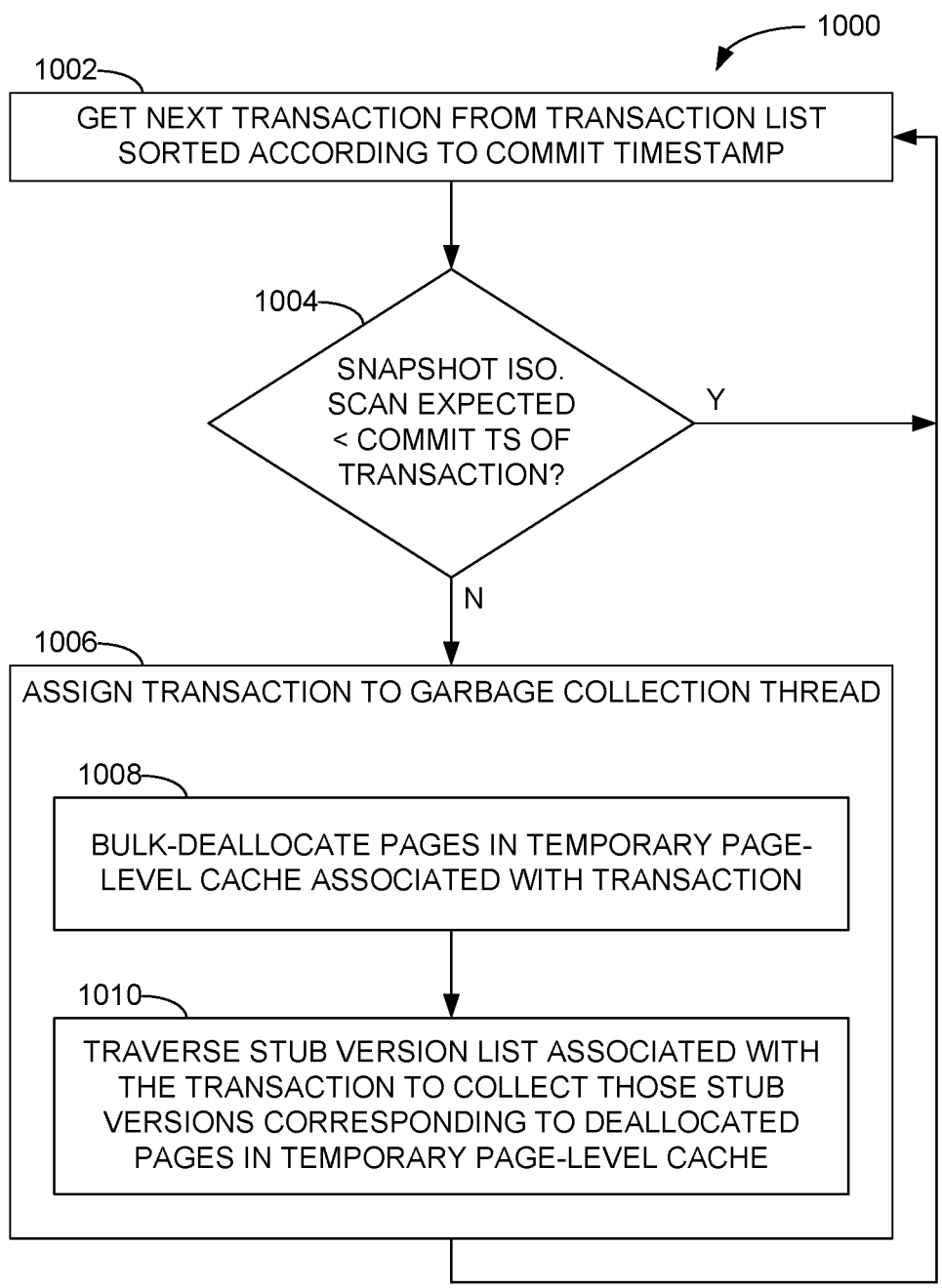
FIG. 10 is a flow diagram of an example method of performing garbage collection using the temporary page-level cache of FIG. 9.

FIG. 10 is a flow diagram of an example method 1000 of performing garbage collection using the temporary page-level cache 112 of FIG. 9. In the method 1000, the database management system 130 (e.g., via the garbage collection module 210) may get the next transaction from a transaction list sorted according to the commit timestamp of each transaction (operation 1002). In an example embodiment, this information may be retrieved from the transaction data structures 402, which include the commit timestamps. If a snapshot isolation scan may be expected that employs a scan timestamp less than the commit timestamp of the transaction (operation 1004), then the previous versions of rows obsoleted by that transaction cannot be deallocated in the temporary page-level cache 112 at this point. In an example embodiment, a snapshot isolation scan may be expected until an isolation scan is executed with a timestamp that is greater than or equal to the commit timestamp of the transaction being processed for possible garbage collection.

If, instead, no snapshot isolation scan with a scan timestamp less than the commit timestamp of the transaction is expected to run (operation 1004), deallocation of the previous versions of rows in the temporary page-level cache 112 and their associated stub row versions 304 in the row-level cache 120 may be performed. In an example embodiment, this particular transaction may be assigned exclusively to a single garbage collection thread (operation 1006), thus ensuring that no other thread will attempt to perform the garbage collection operations associated with that transaction.

The particular garbage collection thread to which the transaction is assigned may then bulk-deallocate all pages 114 in the temporary page-level cache 112 reserved for that transaction (operation 1008). In an example embodiment, those pages 114 are identified in the transaction data structure 402 for that transaction. Further, in an example embodiment, the thread may traverse the stub row versions 304 in the row-level cache 120 to deallocate those stub row versions 304 associated with the rows previously stored in the deallocated pages 114 (operation 1010), starting from the transaction data structure 402 for the assigned transaction, and proceeding downward and to the right along the links between the various stub row versions 304. In an example embodiment, the garbage collection thread may mark each stub row version 304 (e.g., set a bit in the stub row version 304) that the garbage collection thread has traversed, which may be employed by future garbage collection activities employed in the row-level cache 120.

For example, the garbage collection actions described above may not deallocate the most recent stub row version 304 in the row-level cache 120 for one or more database rows (e.g., those stub row versions 304 referring to current images of rows stored in the MVCC page-level cache 102), as the method 1000 of FIG. 10 may not be able to detect whether a snapshot isolation scan that may require access to the most recent stub row version 304 is currently executing. However, if a garbage collection thread marks each stub row version 304 that it has traversed, including those that are the most recent stub version 304 for a particular database row, such a mark would be an indication that no other snapshot isolations are executing that may require use of the most recent stub row version 304.

Figure 11:
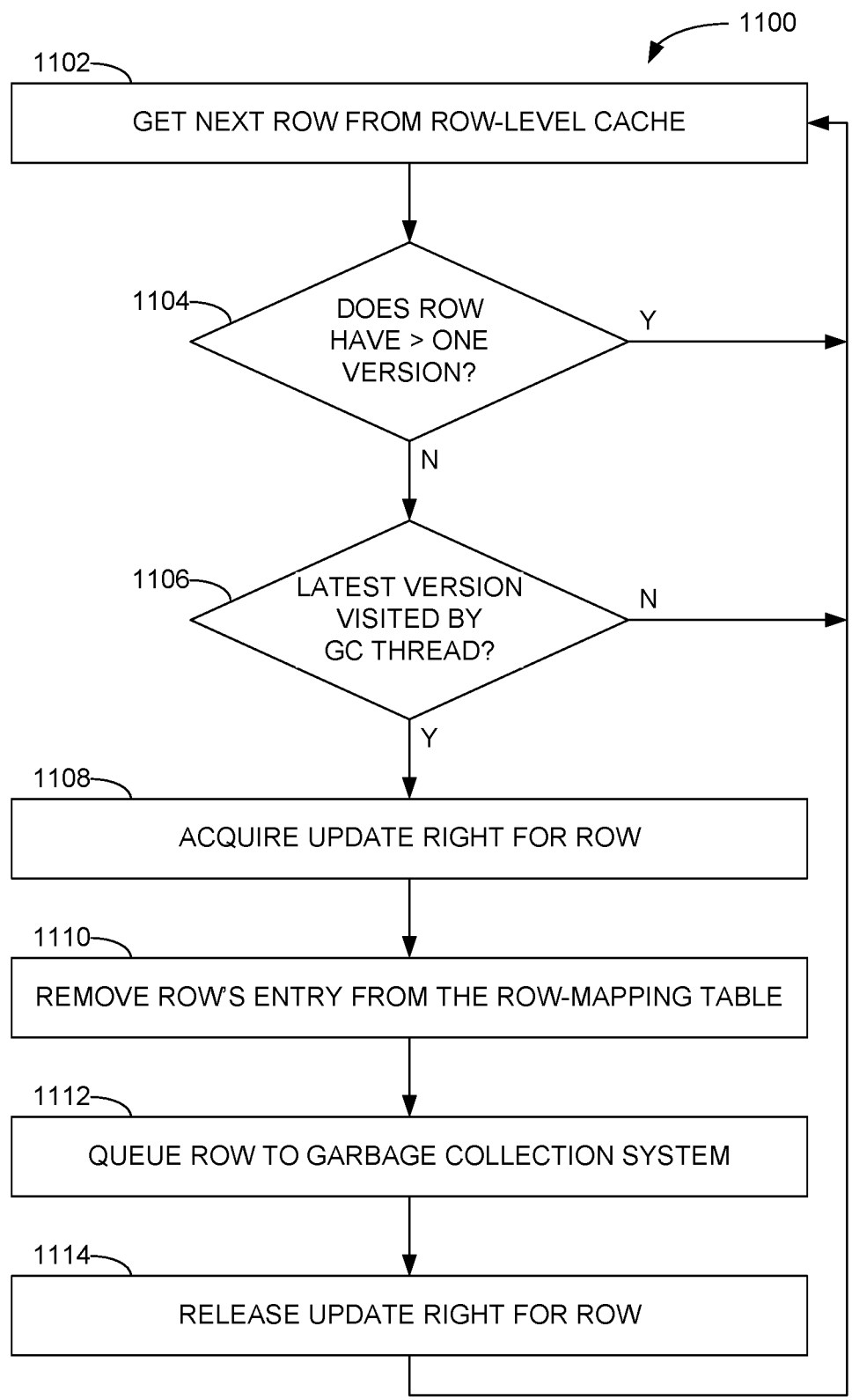
FIG. 11 is a flow diagram of an example method of packing rows in the row-level cache for subsequent garbage collection.

To facilitate collection of the most recent stub row versions 304 under those circumstances, FIG. 11 is a flow diagram of an example method 1100 of "packing" (e.g., rendering unreachable to snapshot isolation scanners) rows in the row-level cache 120 for subsequent garbage collection (e.g., via the row-packing module 212 of the database management system 130). In the method 1100, which may progress row-by-row, a packing thread may access the next row from the row-level cache 120 (operation 1102), such as by retrieving the next available row address 414 from the row-mapping table 410. If that row includes more than one stub row version 304, or the row includes only one stub row version 304 (operation 1104) that has not been traversed or visited by a garbage collection thread (operation 1106) (e.g., a bit in the stub row version 304 indicating traversal by a garbage collection thread has not been set), the packing thread may terminate or access the next row from the row-level cache 120 (operation 1102). In an example embodiment, if the single remaining stub row version 304 has not been reviewed by a garbage collection thread, a snapshot isolation scanner with a scan timestamp earlier than the transaction commit timestamp of the single stub row version 304 should not be able to access the current image of the associated database row in the MVCC page-level cache 102, as that version of the row would not have existed at the time of the scan timestamp. However, if that stub row version 304 were to be deallocated, the scanner may assume that the current version of the row stored in the MVCC page-level cache 102 was available at the time of the scan timestamp, which would be an incorrect result since that most recent version was not committed until some point in time after the scan timestamp.

If, instead, the row includes only a single stub row version 304 (operation 1104) that has been traversed or visited by a garbage collection thread (operation 1106), the corresponding row in the row-level cache 120 may be packed for deallocation, as no other scanners with a scan timestamp earlier than the commit timestamp associated with the stub row version 304 would be expected. Accordingly, the packing thread may acquire an update right (e.g., a lock or latch) for that row (operation 1108) that allows reading, but not updating, of the row by scanners or other entities. The packing thread may then remove the entry for that row in the row-mapping table 410 (operation 1110) to render that row unreachable to scanners, queue the row to the garbage collection system (e.g., the garbage collection module 210 of the database management system 130) for deallocation (operation 1112), and release the update right for the row in the row-level cache 120 (operation 1114).

Figure 12:
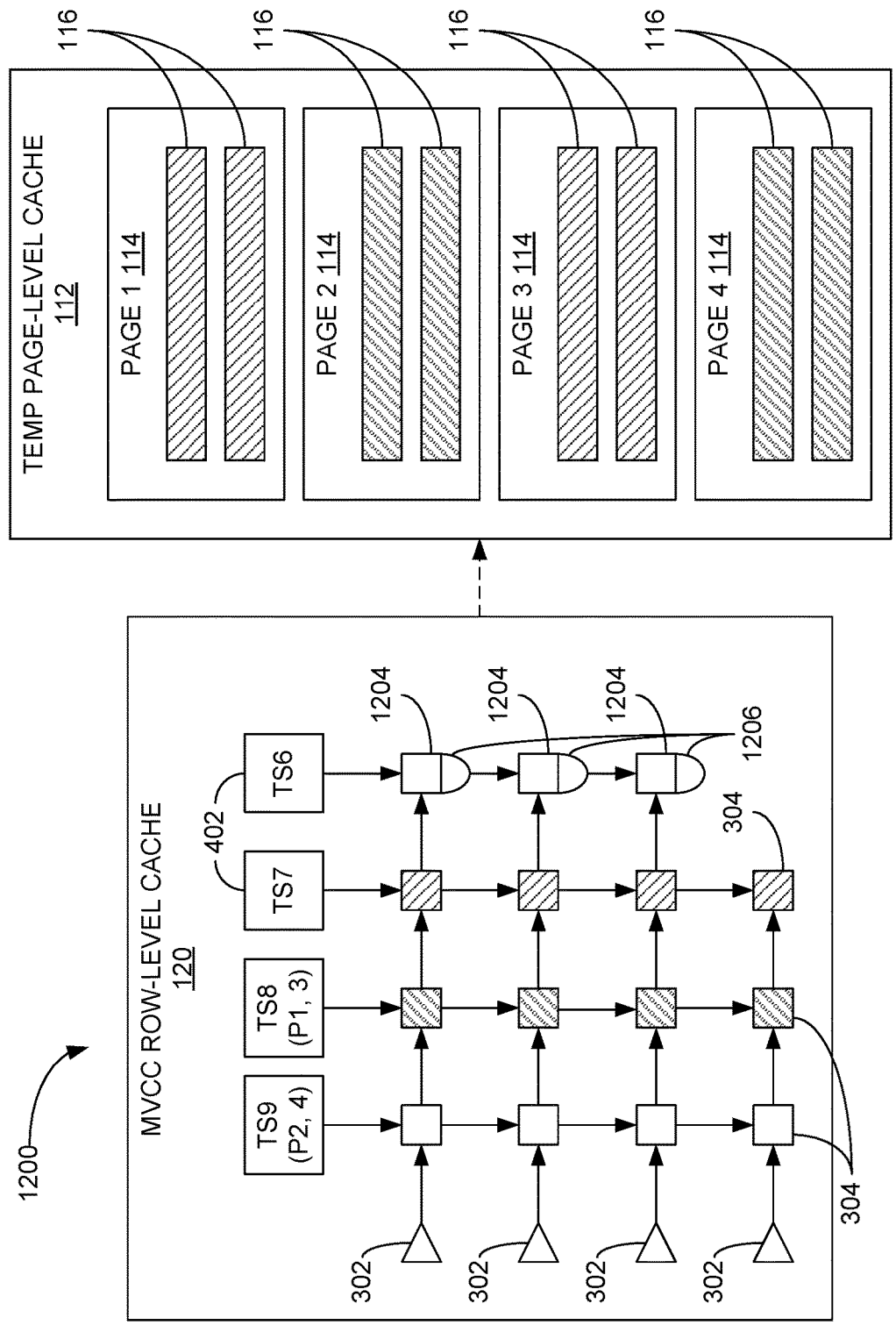
FIG. 12 is a block diagram of an example state of the example row-level cache and the example temporary page-level cache in which the row-level cache stores one or more row images.

In some example embodiments, the row-level cache 120 may be employed to store one or more of the actual row images of previous versions of rows that would otherwise be stored in the temporary page-level cache 112. FIG. 12 is a block diagram of an example state 1200 of the row-level cache 120 and the temporary page-level cache 112 in which the row-level cache 120 stores one or more such row images. In some example embodiments, storage of the row images in the row-level cache 120 may expedite access to those images by a scanner or other entity compared to accessing those images in the temporary page-level cache 112. As depicted in FIG. 12, while some of the stub row versions 304 may refer to their corresponding row images in the temporary page-level cache 112 (as indicated by the left-leaning and right-leaning stripes correlating those stub row versions 304 with their corresponding row 116 in the temporary page-level cache 112), other stub row versions 1204 may store their corresponding row images 1206 within the row-level cache 120.

Figure 13:
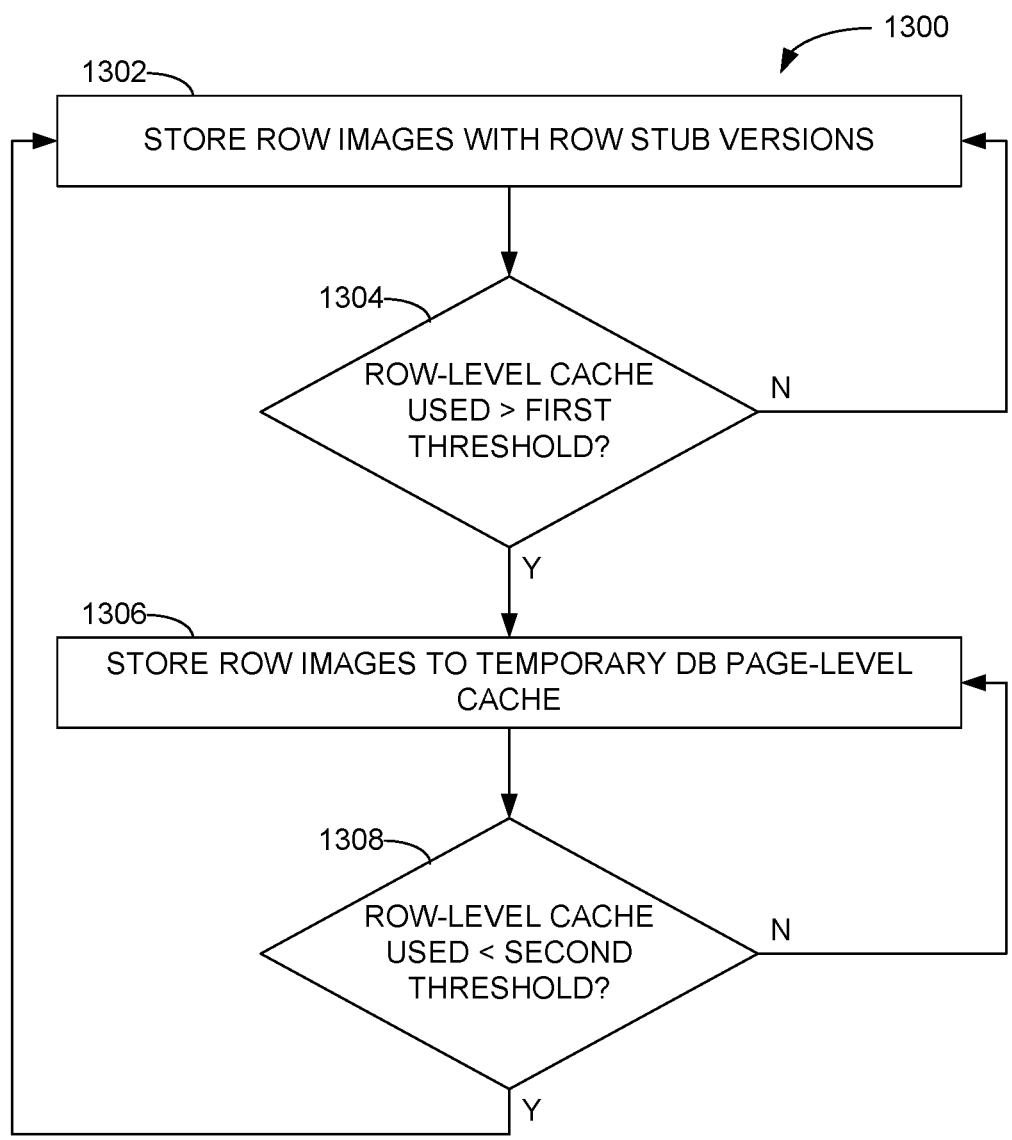
FIG. 13 is a flow diagram of an example method of employing the row-level cache to store one or more row images, as depicted in FIG. 12.

In example embodiments, the database management system 130 (e.g. via the row insertion module 202 or the row update module 206 of FIG. 2) may determine whether the image of the previous version of a database row is to be stored in the row-level cache 120 or the temporary page-level cache 112. FIG. 13 is a flow diagram of an example method 1300 of employing the row-level cache 120 to store one or more row images, as depicted in FIG. 12, based on the available amount of allocable data space available in the row-level cache 120. In the method 1300, the database management system 130 may store the row images of the previous versions of the rows with their stub row versions 1204 in the row-level cache 120 (operation 1302), presuming sufficient free data space initially exists therein. While storing the row images in the row-level cache 120, if the amount of used data space in the row-level cache 120 exceeds a first threshold (e.g., 80 percent) (operation 1304), then the database management system 130 may begin storing the row images to the temporary page-level cache 112 (operation 1306), as described above. While continuing to store the row images in the temporary page-level cache 112, if the amount of used data space in the row-level cache 120 drops below a second threshold (e.g., 20 percent) (operation 1308) (e.g., due to garbage collection activities), the database management system 130 may then return to storing the previous row images in the row-level cache 120 (operation 1302). In other example embodiments, the percentages for the first and second thresholds may be different from those indicated above, and in some example embodiments, the first and second threshold may be the same.

In an example embodiment, a system comprises one or more hardware processors and a memory storing instructions that, when executed by at least one of the one or more hardware processors, cause the apparatus to perform operations comprising receiving an update command for a first row of a plurality of rows of a database, the update command comprising a new version of the first row, wherein a first memory area comprises an image of each of the plurality of rows; and in response to the update command, storing the image of the first row in a second memory area; storing, in the second data structure, a pointer to the image of the first row stored in the first memory area; linking the second data structure to the first data structure; storing, in the third memory area, a second timestamp associated with the update command; linking the second timestamp to the second data structure; and overwriting the image of the first row in the first memory area with an image of the new version of the first row.

In another example embodiment, including all previous example embodiments, the operations further comprise, in response to the update command, storing the first data structure and the first timestamp in the third memory area, and linking the first timestamp to the first data structure.

In another example embodiment, including all previous example embodiments, the first data structure and the first timestamp are stored in the third memory area, and the first timestamp is linked to the first data structure, prior to the receiving of the update command.

In another example embodiment, including all previous example embodiments, the operations further comprise receiving a select command for the first row of the plurality of rows of the database, the select command comprising a select timestamp; comparing the select timestamp to at least one of the first timestamp and the second timestamp; selecting one of the first data structure and the second data structure based on the comparing of the select timestamp to at least one of the first timestamp and the second timestamp; returning, in response to selecting the first data structure, the image of the first row stored in the second memory area using the pointer in the first data structure; and returning, in response to selecting the second data structure, the image of the first row stored in the first memory area using the pointer in the second data structure.

In another example embodiment, including all previous example embodiments, the selecting of one of the first data structure and the second data structure comprise selecting the second data structure based on the select timestamp being greater than the second timestamp, and selecting the first data structure based on the select timestamp being less than the second timestamp and greater than the first timestamp.

In another example embodiment, including all previous example embodiments, the operations further comprise receiving a select command for the first row of the plurality of rows of the database, the select command not comprising a select timestamp; and returning the image of the first row stored in the first memory area.

In another example embodiment, including all previous example embodiments, the operations further comprise receiving an insert command for a second row of the plurality of rows of the database, the insert command comprising an image of the second row; and in response to receiving the insert command, storing the image of the second row in the first memory area; and storing, in the third memory area, a third data structure comprising a pointer to the image of the second row in the first memory area.

In another example embodiment, including all previous example embodiments, the operations further comprise obtaining, prior to the storing of the image of the second row, a shared right to access a memory page of the first memory area, the memory page to store the third data structure; and releasing, after the storing of the third data structure, the shared right.

In another example embodiment, including all previous example embodiments, the operations further comprise receiving, after the overwriting of the image of the first row in the first memory area with the image of the new version of the first row, a delete command for the first row of the plurality of rows of the database; and in response to receiving the delete command, storing the image of the new version of the first row in the second memory area; storing, in the third memory area, a third data structure representing a deletion of the first row from the plurality of rows; storing, in the third data structure, a pointer to the image of the first row stored in the second memory area; linking the third data structure to the second data structure; storing, in the third memory area, a third timestamp associated with the delete command; linking the third timestamp to the third data structure; and marking the first row in the first memory area as deleted.

In another example embodiment, including all previous example embodiments, the operations further comprise obtaining, prior to the marking of the first row, an exclusive right to access a memory page of the first memory area, the memory page storing the image of the new version of the first row; and releasing, after the marking of the first row, the exclusive right.

In another example embodiment, including all previous example embodiments, the first memory area comprises a first page-level cache, the second memory area comprises a second page-level cache, and the third memory area comprises a row-level cache.

In another example embodiment, including all previous example embodiments, the second page-level cache comprises a plurality of memory pages, and the operations further comprise determining a first memory page of the plurality of memory pages that is reserved for a database transaction comprising the update command, the storing of the image of the first row in the second memory area comprising storing the image of the first row to the first memory page of the second page-level cache without obtaining an exclusive right to access the first memory page of the second page-level cache.

In another example embodiment, including all previous example embodiments, the first page-level cache comprises a plurality of memory pages, and the overwriting of the image of the first row in the first memory area with the image of the new version of the first row comprises obtaining an exclusive right to access a first memory page of the plurality of pages of the first page-level cache, the first memory page storing the image of the first row; overwriting, while holding the exclusive right, the image of the first row in the first memory page with the image of the new version of the first row; and releasing the exclusive right after the overwriting of the image of the first row.

In another example embodiment, including all previous example embodiments, the operations further comprise determining, based on the first timestamp, whether a memory page of the second memory area in which the image of the first row is stored may be deallocated, the memory page corresponding to a transaction associated with the first timestamp; and deallocating, based on the determining whether the memory page of the second memory area may be deallocated, the memory page.

In another example embodiment, including all previous example embodiments, the determining whether the memory page of the second memory area in which the image of the first row is stored may be deallocated comprises determining whether a select command is expected to be executed corresponding to a timestamp less than the first timestamp; and determining that the memory page may be deallocated based on a determination that the select command is not expected to be executed corresponding to a timestamp less than the first timestamp.

In another example embodiment, including all previous example embodiments, the operations further comprise deallocating, based on the determining whether the memory page of the second memory area may be deallocated, the second data structure from the third memory area.

In another example embodiment, including all previous example embodiments, the operations further comprise, in response to the update command, determining, prior to the storing of the image of the first row in the second memory area, that an amount of data space available in the third memory area is less than a first threshold amount, the storing of the image of the first row in the second memory area being based on the determining that the amount of data space available in the third memory area is less than the first threshold amount.

In another example embodiment, including all previous example embodiments, the operations further comprise receiving, after the storing of the image of the first row in the second memory area, a second update command for the first row, the second update command comprising a second new version of the first row, the new version of the first row comprising a first new version of the first row; and in response to the second update command, determining that the amount of data space available in the third memory area is greater than a second threshold amount; and storing, based on the determining that an amount of data space available in the third memory area is greater than the second threshold amount, an image of the first new version of the first row in the third memory area.

In an example embodiment, a method comprises receiving an update command for a first row of a plurality of rows of a database, the update command comprising a new version of the first row, wherein a first memory area comprises an image of each of the plurality of rows; and in response to the update command, storing the image of the first row in a second memory area; storing, in a third memory area comprising a first data structure corresponding to the image of the first row stored in the first memory area, using one or more hardware processors of a machine, a second data structure corresponding to the image of the first row in the second memory area, the third memory area further storing a first timestamp linked to the first data structure; storing, in the first data structure, a pointer to the image of the first row stored in the second memory area; storing, in the second data structure, a pointer to the image of the first row stored in the first memory area; linking the second data structure to the first data structure; storing, in the third memory area, a second timestamp associated with the update command; linking the second timestamp to the second data structure; and overwriting the image of the first row in the first memory area with an image of the new version of the first row.

In an example embodiment, a non-transitory computer-readable storage medium has stored therein instructions that, when executed by one or more processors of a machine, cause the machine to perform operations comprising receiving an update command for a first row of a plurality of rows of a database, the update command comprising a new version of the first row, wherein a first memory area comprises an image of each of the plurality of rows; and in response to the update command, storing the image of the first row in a second memory area; storing, in a third memory area comprising a first data structure corresponding to the image of the first row stored in the first memory area, a second data structure corresponding to the image of the first row in the second memory area, the third memory area further storing a first timestamp linked to the first data structure; storing, in the first data structure, a pointer to the image of the first row stored in the second memory area; storing, in the second data structure, a pointer to the image of the first row stored in the first memory area; linking the second data structure to the first data structure; storing, in the third memory area, a second timestamp associated with the update command; linking the second timestamp to the second data structure; and overwriting the image of the first row in the first memory area with an image of the new version of the first row.

Figure 14:
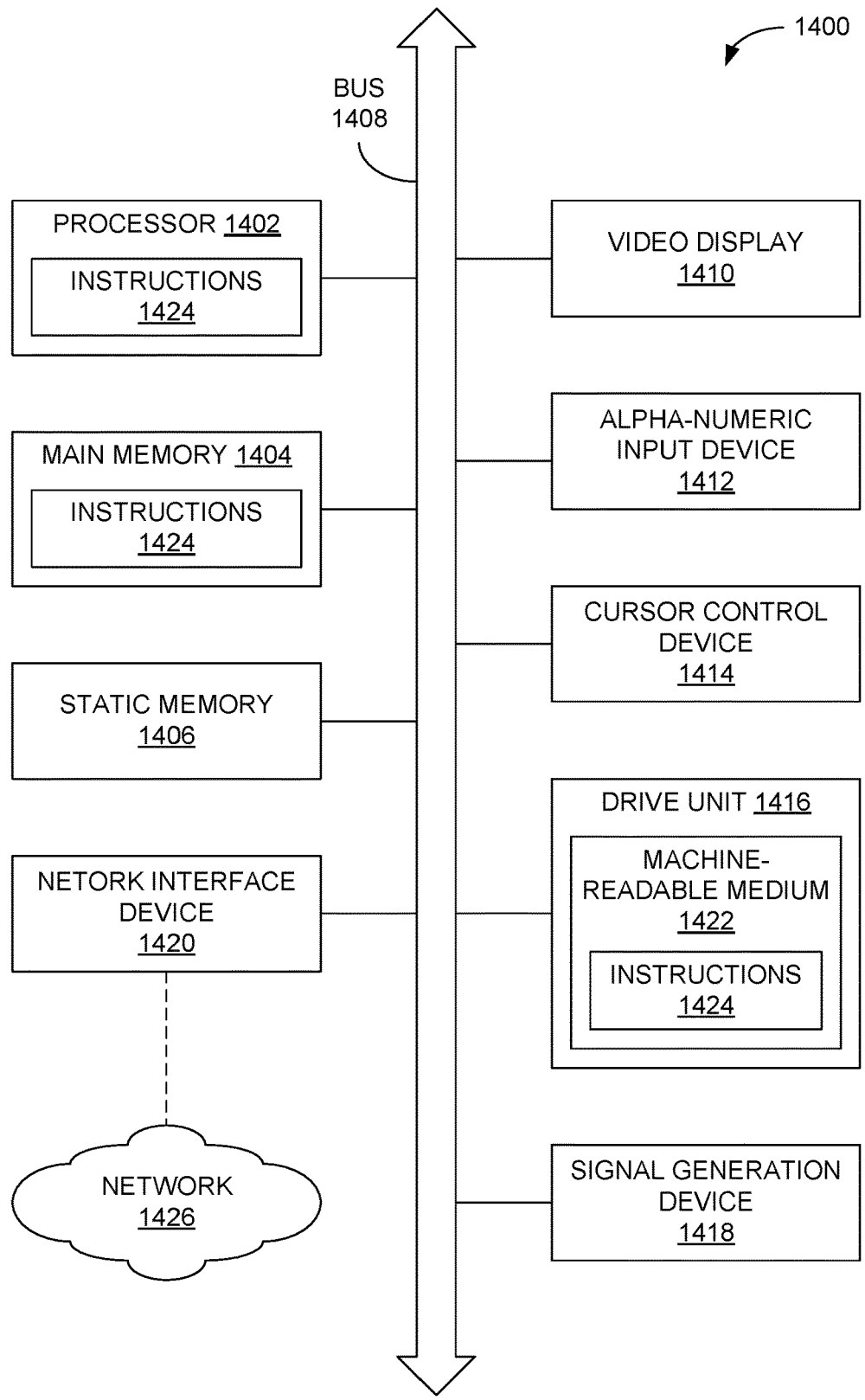
FIG. 14 is a block diagram of a computer processing system within which a set of instructions may be executed for causing a computer to perform any one or more of the methodologies discussed herein.

FIG. 14 is a block diagram of a computer processing system 1400 within which a set of instructions 1424 may be executed for causing a computer to perform any one or more of the methodologies discussed herein, such as those discussed in conjunction with FIGS. 3A-3C and FIGS. 4-13, as well as other methodologies discussed herein. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. Moreover, the computer processing system 1400 may serve in example embodiments as, for example, the database management system 130 of FIG. 2, as well as any component or module 202-212 described therewith.

In addition to being sold or licensed via traditional channels, embodiments may also be deployed, for example, by software-as-a-service (SaaS) providers, application service providers (ASPs), or by utility computing providers. The computer may be a server computer, a personal computer (PC), a tablet PC, a personal digital assistant (PDA), a cellular telephone, or any processing device capable of executing a set of instructions (sequential or otherwise) that specify actions to be taken by that device. Further, while only a single computer is illustrated, the term "computer" shall also be taken to include any collection of computers that, individually or jointly, execute a set (or multiple sets) of instructions to perform any one or more of the methodologies discussed herein.

The example computer processing system 1400 includes a processor 1402 (e.g., a central processing unit (CPU), a graphics processing unit (GPU), or both), a main memory 1404, and a static memory 1406, which communicate with each other via a bus 1408. The computer processing system 1400 may further include a video display 1410 (e.g., a plasma display, a liquid crystal display (LCD), or a cathode ray tube (CRT)). The computer processing system 1400 also includes an alphanumeric input device 1412 (e.g., a keyboard), a user interface (UI) cursor control device 1414 (e.g., a mouse and/or touch screen), a drive unit 1416, a signal generation device 1418 (e.g., a speaker), and a network interface device 1420.

The drive unit 1416 includes a machine-readable medium 1422 on which is stored one or more sets of instructions 1424 and data structures embodying or utilized by any one or more of the methodologies or functions described herein. The instructions 1424 may also reside, completely or at least partially, within the main memory 1404, the static memory 1406, and/or the processor 1402 during execution thereof by the computer processing system 1400, the main memory 1404, the static memory 1406, and the processor 1402 also constituting tangible machine-readable media 1422.

The instructions 1424 may further be transmitted or received over a network 1426 via the network interface device 1420 utilizing any one of a number of well-known transfer protocols (e.g., Hypertext Transfer Protocol).

While the machine-readable medium 1422 is shown in an example embodiment to be a single medium, the term "machine-readable medium" should be taken to include a single medium or multiple media (e.g., a centralized or distributed database, and/or associated caches and servers) that store the one or more sets of instructions 1424. The term "machine-readable medium" shall also be taken to include any medium that is capable of storing, encoding, or carrying a set of instructions 1424 for execution by the computer and that cause the computer to perform any one or more of the methodologies of the present application, or that is capable of storing, encoding, or carrying data structures utilized by or associated with such a set of instructions 1424. The term "machine-readable medium" shall accordingly be taken to include, but not be limited to, solid-state memories, optical and magnetic media, and other non-transitory media.

While the example embodiments discussed herein are described with reference to various implementations and exploitations, these example embodiments are illustrative, and the scope of the disclosure is not so limited. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are possible and may fall within a scope of various embodiments of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements fall within a scope of embodiments of the present disclosure as represented by the appended claims.

What is claimed is:

1. A system comprising:
one or more hardware processors; and
a memory storing instructions that, when executed by at least one of the one or more hardware processors, cause the system to perform operations comprising:
receiving an update command for a first row of a plurality of rows of a database, the update command comprising a new version of the first row, wherein a first memory area comprises an image of each of the plurality of rows; and
in response to the update command,
storing the image of the first row in a second memory area;
storing, in a third memory area comprising a first data structure corresponding to the image of the first row stored in the first memory area, a second data structure corresponding to the image of the first row in the second memory area, the third memory area further storing a first timestamp linked to the first data structure;
storing, in the first data structure, a pointer to the image of the first row stored in the second memory area;
storing, in the second data structure, a pointer to the image of the first row stored in the first memory area;
linking the second data structure to the first data structure;
storing, in the third memory area, a second timestamp associated with the update command;
linking the second timestamp to the second data structure; and
overwriting the image of the first row in the first memory area with an image of the new version of the first row.

2. The system of claim 1, the operations further comprising:
in response to the update command,
storing the first data structure and the first timestamp in the third memory area; and
linking the first timestamp to the first data structure.

3. The system of claim 1, the first data structure and the first timestamp being stored in the third memory area, and the first timestamp being linked to the first data structure, prior to the receiving of the update command.

4. The system of claim 1, the operations further comprising:
receiving a select command for the first row of the plurality of rows of the database, the select command comprising a select timestamp;
comparing the select timestamp to at least one of the first timestamp and the second timestamp;
selecting one of the first data structure and the second data structure based on the comparing of the select timestamp to at least one of the first timestamp and the second timestamp;
returning, in response to selecting the first data structure, the image of the first row stored in the second memory area using the pointer in the first data structure; and
returning, in response to selecting the second data structure, the image of the first row stored in the first memory area using the pointer in the second data structure.

5. The system of claim 4, the selecting of one of the first data structure and the second data structure comprising:
selecting the second data structure based on the select timestamp being greater than the second timestamp; and selecting the first data structure based on the select timestamp being less than the second timestamp and greater than the first timestamp.

6. The system of claim 1, the operations further comprising:
receiving a select command for the first row of the plurality of rows of the database, the select command not comprising a select timestamp; and
returning the image of the first row stored in the first memory area.

7. The system of claim 1, the operations further comprising:
receiving an insert command for a second row of the plurality of rows of the database, the insert command comprising an image of the second row; and
in response to receiving the insert command,
storing the image of the second row in the first memory area; and
storing, in the third memory area, a third data structure comprising a pointer to the image of the second row in the first memory area.

8. The system of claim 7, the operations further comprising:
obtaining, prior to the storing of the image of the second row, a shared right to access a memory page of the first memory area, the memory page to store the third data structure; and
releasing, after the storing of the third data structure, the shared right.

9. The system of claim 1, the operations further comprising:
receiving, after the overwriting of the image of the first row in the first memory area with the image of the new version of the first row, a delete command for the first row of the plurality of rows of the database; and
in response to receiving the delete command,
storing the image of the new version of the first row in the second memory area;
storing, in the third memory area, a third data structure representing a deletion of the first row from the plurality of rows;
storing, in the third data structure, a pointer to the image of the first row stored in the second memory area;
linking the third data structure to the second data structure;
storing, in the third memory area, a third timestamp associated with the delete command;
linking the third timestamp to the third data structure; and
marking the first row in the first memory area as deleted.

10. The system of claim 9, the operations further comprising:
obtaining, prior to the marking of the first row, an exclusive right to access a memory page of the first memory area, the memory page storing the image of the new version of the first row; and
releasing, after the marking of the first row, the exclusive right.

11. The system of claim 1, the first memory area comprising a first page-level cache, the second memory area comprising a second page-level cache, and the third memory area comprising a row-level cache.

12. The system of claim 11, the second page-level cache comprising a plurality of memory pages, the operations further comprising determining a first memory page of the plurality of memory pages that is reserved for a database transaction comprising the update command, the storing of the image of the first row in the second memory area comprising storing the image of the first row to the first memory page of the second page-level cache without obtaining an exclusive right to access the first memory page of the second page-level cache.

13. The system of claim 11, the first page-level cache comprising a plurality of memory pages, the overwriting of the image of the first row in the first memory area with the image of the new version of the first row comprising:
obtaining an exclusive right to access a first memory page of the plurality of pages of the first page-level cache, the first memory page storing the image of the first row;
overwriting, while holding the exclusive right, the image of the first row in the first memory page with the image of the new version of the first row; and
releasing the exclusive right after the overwriting of the image of the first row.

14. The system of claim 1, the operations further comprising:
determining, based on the first timestamp, whether a memory page of the second memory area in which the image of the first row is stored may be deallocated, the memory page corresponding to a transaction associated with the first timestamp; and
deallocating, based on the determining whether the memory page of the second memory area may be deallocated, the memory page.

15. The system of claim 14, the determining whether the memory page of the second memory area in which the image of the first row is stored may be deallocated comprising:
determining whether a select command is expected to be executed corresponding to a timestamp less than the first timestamp; and
determining that the memory page may be deallocated based on a determination that the select command is not expected to be executed corresponding to a timestamp less than the first timestamp.

16. The system of claim 14, the operations further comprising:
deallocating, based on the determining whether the memory page of the second memory area may be deallocated, the second data structure from the third memory area.

17. The system of claim 1, the operations further comprising:
in response to the update command,
determining, prior to the storing of the image of the first row in the second memory area, that an amount of data space available in the third memory area is less than a first threshold amount, the storing of the image of the first row in the second memory area being based on the determining that the amount of data space available in the third memory area is less than the first threshold amount.

18. The system of claim 17, the operations further comprising:
receiving, after the storing of the image of the first row in the second memory area, a second update command for the first row, the second update command comprising a second new version of the first row, the new version of the first row comprising a first new version of the first row; and
in response to the second update command, determining that the amount of data space available in the third memory area is greater than a second threshold amount; and storing, based on the determining that an amount of data space available in the third memory area is greater than the second threshold amount, an image of the first new version of the first row in the third memory area.

19. A method comprising:

receiving an update command for a first row of a plurality of rows of a database, the update command comprising a new version of the first row, wherein a first memory area comprises an image of each of the plurality of rows; and in response to the update command,
storing the image of the first row in a second memory area;
storing, in a third memory area comprising a first data structure corresponding to the image of the first row stored in the first memory area, using one or more hardware processors of a machine, a second data structure corresponding to the image of the first row in the second memory area, the third memory area further storing a first timestamp linked to the first data structure;
storing, in the first data structure, a pointer to the image of the first row stored in the second memory area;
storing, in the second data structure, a pointer to the image of the first row stored in the first memory area;
linking the second data structure to the first data structure;
storing, in the third memory area, a second timestamp associated with the update command;
linking the second timestamp to the second data structure; and
overwriting the image of the first row in the first memory area with an image of the new version of the first row.

20. A non-transitory computer-readable storage medium having stored therein instructions that, when executed by one or more processors of a machine, cause the machine to perform operations comprising:

receiving an update command for a first row of a plurality of rows of a database, the update command comprising a new version of the first row, wherein a first memory area comprises an image of each of the plurality of rows; and in response to the update command,
storing the image of the first row in a second memory area;
storing, in a third memory area comprising a first data structure corresponding to the image of the first row stored in the first memory area, a second data structure corresponding to the image of the first row in the second memory area, the third memory area further storing a first timestamp linked to the first data structure;
storing, in the first data structure, a pointer to the image of the first row stored in the second memory area;
storing, in the second data structure, a pointer to the image of the first row stored in the first memory area;
linking the second data structure to the first data structure;
storing, in the third memory area, a second timestamp associated with the update command;
linking the second timestamp to the second data structure; and
overwriting the image of the first row in the first memory area with an image of the new version of the first row.

* * * * *